Feb. 23, 1932.                    V. BUSH                    1,846,307
REFRIGERATION
Original Filed Dec. 13. 1927
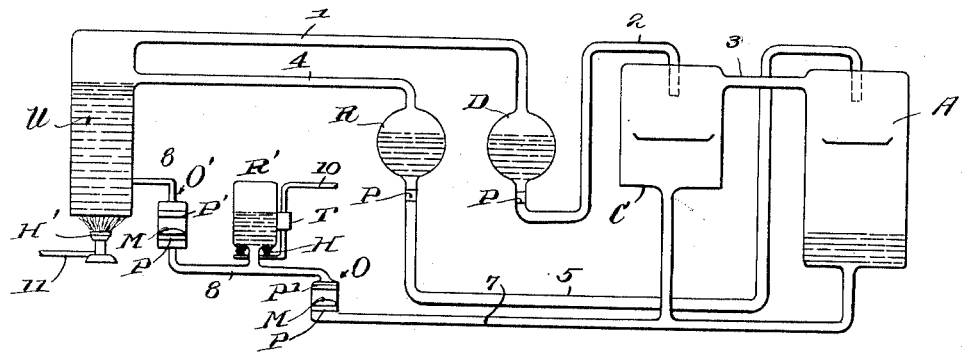
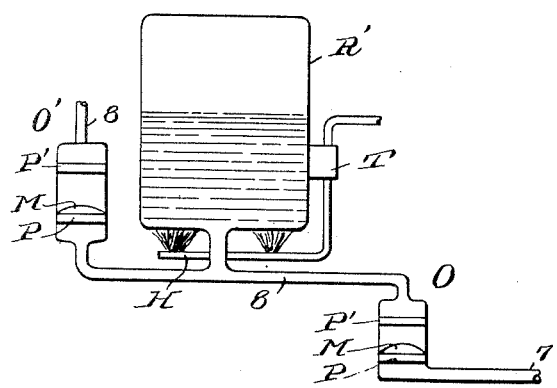
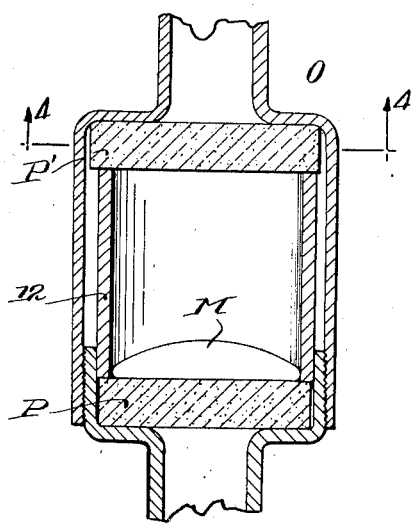
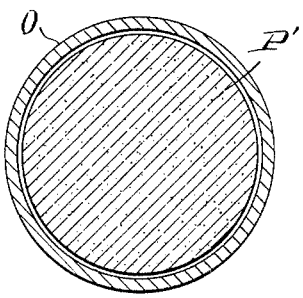
Inventor
Vannevar Bush
by Roberts Cushman & Woodberry
attys.

Patented Feb. 23, 1932

1,846,307

UNITED STATES PATENT OFFICE

VANNEVAR BUSH, OF BELMONT, MASSACHUSETTS, ASSIGNOR TO CAMBRIDGE LABORATORIES, INC., OF CAMBRIDGE, MASSACHUSETTS, A CORPORATION OF MASSACHUSETTS

REFRIGERATION

Application filed December 13, 1927, Serial No. 239,697. Renewed July 25, 1931.

This invention is particularly applicable to the art of refrigeration, having for its principal objects the provision of means for circulating a fluid and means for maintaining differences of pressure which are simple to construct and easy to install, which permit the system to be hermetically sealed, which eliminate the use of packing material, and which are proof against faulty adjustments and other troubles incident to check valves and other expedients heretofore employed. Another prime object is to provide simple and effective means for passing liquid while restraining the passage of gaseous fluid.

A cardinal feature of the invention comprises a semi-permeable plug built into or adapted to be mounted in a fluid passageway, chamber or other conduit. This plug is preferably made of porcelain or other porous material in which the pores are small. By making the pores sufficiently small the surface tension of a liquid which wets the surfaces of the pores is adequate to withstand a large difference in pressure on opposite sides of the plug so that relatively high and low gas pressures may be maintained on opposite sides of the plug respectively without passing substantially any gaseous fluid up to a predetermined pressure, whereby only liquid may be passed up to the predetermined pressure and whereby gaseous fluid may be passed in limited degree beyond the predetermined pressure to maintain an approximately uniform difference in pressure or an approximately fixed minimum difference in pressure on opposite sides of the plug. The size of the pores depends upon the conditions of use (fluid to be passed, pressure differences, etc.) but in any case the size should be of a small order of magnitude. For example, in an absorption system employing water and ammonia and the usual pressures, where it is desired to pass water or liquid ammonia or a mixture of the two without passing ammonia gas, the pores may be of the order of five ten-thousandths of an inch in diameter.

Where it is desired to pass liquid in one direction only, one side of the plug may be provided with a seal of liquid which does not wet the pores of the plug readily or at all, in which case neither liquid nor gaseous fluid can reach the plug through the seal and therefore the only flow through the plug must be liquid from the side opposite the seal. The liquid constituting the seal is preferably held in position to cover one end of the plug by gravity, a suitable liquid comprising mercury.

By providing two plugs in series with liquid seals on corresponding sides a pumping action may be effected by producing a variation of pressure in a reservoir between the plugs. When the pressure in the reservoir falls below the pressure in advance of the first plug, liquid flows through the plug into the reservoir. Then by raising the pressure in the reservoir above the presure in advance of the second plug the liquid in the reservoir flows out through the second plug, no liquid flowing back through the first plug because of the seal of non-wetting liquid.

While the invention may be variously applied in its different aspects, for simplicity and conciseness illustrative applications have been shown in a single refrigeration system in the accompanying drawings in which:

Fig. 1 is a diagram of the entire system;
Fig. 2 is a diagram of the pump;
Fig. 3 is a longitudinal central section of one form of one-way valve; and
Fig. 4 is a transverse section on line 4—4 of Fig. 3, of one form of semi-permeable plug.

The particular application of the invention chosen for the purpose of illustration comprises a refrigeration system of the absorption type comprising a vaporizer V, a heat dissipator or condenser D, a cooler C where heat is abstracted from a refrigerator or other space to be cooled, an absorber A where the refrigerant fluid is absorbed by a carrier fluid to be returned to the vaporizer V, two reservoirs R and R', and two one-way valves O and O', interconnected by ducts 1 to 9 inclusive. Inserted in ducts 2, 5, 7 and 8 are semi-permeable plugs P such as above described, the plugs in ducts 7 and 8 having liquid seals M over their upper surfaces. Additional plugs P' may be provided over the liquid seals to prevent the escape of the liquid constituting the seal in transporting, assembling or repairing the valves O and O'. H represents a gas burner under the reservoir R', the burner receiving gas from the duct 10 in which is connected a thermostatically controlled valve T in heat-transfer relation to the reservoir R'. Another heater is preferably associated with the vaporizer V and in the drawings this heater is illustrated in the form of a gas burner H' receiving gas from duct 11. However, the vaporizer may be of the "flasher" type, the liquid entering in superheated condition and then "flashing" without further application of heat in addition to that derived from the heater H or other circulating means. Any suitable fluids may be employed for the refrigerant and carrier respectively, ammonia and water being the best of which I am now aware.

While the semi-permeable plugs P and P' may be mounted in any suitable way a simple mode of assembly is illustrated in Figs. 3 and 4 in which the casing of valve O is formed in two parts threaded together with a tubular spacer 12 to hold the plugs tightly seated against opposite ends of the casing respectively, suitable packing being employed between the plugs and casing if necessary.

In operation the ammonia is vaporized in V, the vapor passing through duct 1 to the heat dissipator D where the ammonia is condensed. The liquid ammonia passes through the semi-permeable plug P thence through duct 2 to the cooler C where the refrigeration takes place by virtue of the evaporation of the ammonia. The ammonia gas then passes through duct 3 to absorber A where it is absorbed in the water. The combined water and ammonia is then return to the vaporizer by the fluid circulating apparatus now to be described.

When the liquid in reservoir R' is heated by the burner H, it is partially evaporated to produce a pressure sufficient to force a part or all of the remaining liquid therein through the duct 8 and thence through the one-way valve O' to the vaporizer, the valve O preventing this liquid from being forced back through duct 7. When the temperature of the reservoir R' reaches a predetermined value, as for example after all of the liquid has been forced out as aforesaid, the thermostatic valve T closes, cutting off the supply of gas through duct 10. After the reservoir R' has cooled sufficiently to reduce the pressure in the reservoir R' below the pressure existing in the duct 7, liquid flows through the valve O into the reservoir, thereby still further cooling the reservoir. After the reservoir has cooled to a predetermined point, the thermostatic valve T again opens to pass gas to the heater H, the heater preferably being supplied with a pilot in the well-known manner. While any suitable thermostat may be employed in the valve T, a thermostat such as disclosed in the patents and applications of Spencer Thermostat Company of Cambridge, Massachusetts is preferred for the reason that it may readily be adjusted to open the gas valve at a lower temperature than that at which it is closed.

After the ammonia has been driven off from the water in the vaporizer or during this vaporizing process, the water overflows through duct 4 into the reservoir R and thence it returns to the absorber through the duct 5 by the vapor pressure existing in the reservoir and duct 4. The duct 5 may be arranged in heat-transfer relation to duct 7 so that some of the heat of the water in duct 5 may be shunted from the absorber back to the vaporizer through the medium of the liquid flowing in duct 7.

From the foregoing it will be evident that the use of semi-permeable plugs according to this invention affords unique means for passing a liquid without passing gas and for maintaining differences of pressure in different parts of the system without employing check-valves or pressure-reducing valves of the usual type which are likely to leak and otherwise get out of order, this invention eliminating all moving parts and permitting the system to be hermetically sealed.

I claim:

1. A refrigeration system comprising a cooler, a heat dissipator, fluid ducts therebetween, means for circulating refrigerating fluid through the system, and a one-way valve in one of said ducts, said valve comprising a porous plug having on one side a seal of liquid which will not wet the pores of the plug, thereby permitting a flow of liquid refrigerant from the side of the plug opposite the liquid seal.

2. A refrigeration system of the absorption type employing refrigerant and absorption fluids, a cooler, an absorber for absorbing refrigerant from the cooler, a vaporizer, a duct between the absorber and the vaporizer, and means for circulating liquid through said duct from the absorber to the vaporizer, said means comprising a porous plug having, on the side toward the vaporizer, a seal of liquid which does not readily wet the pores of the plug, and intermittent pressure means in advance of said plug, the said plug permitting the flow of only liquid refrigerant from the side of the plug opposite the liquid seal, the passage of gasified refrigerant through the plug being restrained by the said seal.

3. A refrigeration system of the absorption type employing refrigerant and absorption fluids, a cooler, an absorber for absorbing refrigerant from the cooler, a vaporizer, a duct between the absorber and the vaporizer, and means for circulating liquid through said duct from the absorber to the vaporizer, said means comprising two one-way valves spaced apart in said duct and variable pressure means therebetween, one of said valves comprising a porous plug having, on the side toward the vaporizer, a seal of liquid which does not readily wet the pores of the plug, the said plug permitting the flow of liquid refrigerant only from the side of the plug opposite the liquid seal, the passage of gasified refrigerant through the plug being restrained by the said seal.

4. A refrigeration system of the absorption type employing refrigerant and absorption fluids, a cooler, an absorber for absorbing refrigerant from the cooler, a vaporizer, a duct between the absorber and the vaporizer, means for circulating liquid through said duct from the absorber to the vaporizer, said means comprising two porous plugs spaced apart in said duct and variable pressure means, each plug having on the side toward the vaporizer seal of liquid which does not readily wet the pores of the plugs, a duct extending from the vaporizer to the cooler, a condenser in the latter duct, a duct extending from the vaporizer to the absorber, and a porous plug in each of said last two ducts in advance of the cooler and absorber respectively for passing liquid while restraining the passage of gas.

5. A refrigeration system of the absorption type employing refrigerant and absorption fluids, a cooler, an absorber for absorbing refrigerant from the cooler, a vaporizer, a duct between the absorber and the vaporizer, means for circulating liquid through said duct from the absorber to the vaporizer, said means comprising two porous plugs spaced apart in said duct and variable pressure means, each plug having on the side toward the vaporizer a seal of liquid which does not readily wet the pores of the plugs, a duct extending from the vaporizer to the cooler, a condenser in the latter duct, a duct extending from the vaporizer to the absorber, a reservoir in the latter duct, and a porous plug in each of said last two ducts in advance of the cooler and absorber respectively for passing liquid while restraining the passage of gas.

6. A one-way valve, including a porous plug, a seal comprising a liquid which will not readily wet the pores of the plug covering one side of said plug, said seal preventing the flow of fluid through said plug from the side covered by said seal to the opposite side of said plug and permitting a flow of fluid in the opposite direction.

7. A one-way fluid valve comprising a conduit, a plug of porous material permitting passage of fluid disposed within said conduit blocking the same, one side of said plug having its surface covered with a yieldable sealing substance adhering to, but not wetting, the pores of said plug to prevent passage of fluid from the side covered by said sealing substance to the opposite side, and permitting a flow of fluid in the reverse direction.

Signed by me at Cambridge, Massachusetts, this sixteenth day of November, 1927.

VANNEVAR BUSH.